United States Patent Office 2,970,971
Patented Feb. 7, 1961

2,970,971

COMPOSITION OF A MONOEPOXIDE MODIFIED POLYAMIDE AND AN EPOXY RESIN

Irving Katz, Long Beach, Jardine C. Wilson, Compton, and Robert W. Jenkins, San Diego, Calif., assignors to North American Aviation, Inc.

No Drawing. Filed Oct. 31, 1956, Ser. No. 619,408

11 Claims. (Cl. 260—18)

This invention relates to new polyamide-epoxide compositions. More particularly, this invention relates to polyamide and monoepoxide compositions and their condensates as well as to the use of the condensates with epoxide resins.

Polyamide resins have been prepared in the past from dibasic acids and polyamines. The polyamide resins have been suggested for curing complex poly-epoxy resins. However, the polyamides are found to have a high viscosity and also a high alkalinity which are two undesirable characteristics in compounding resins. Polyamides of high alkalinity readily catalyze the polymerization of complex polyepoxy compounds even at room temperature. Hence, the composition often sets up before it can be used in certain applications. Also, it is especially important in certain applications such as in the encapsulating of electrical equipment to have a resin of low viscosity. The reason for this is to permit the escape of all air from the spaces in between turns of electrical wire in the coil being incased in the resin. A need therefore exists for a polyamide composition with a low viscosity and a low alkalinity.

It is therefore an object of this invention to provide a novel polyamide-composition. Another object of this invention is to provide a polyamide composition having lower alkalinity and reduced viscosity. Another object is to provide complex polyepoxide and polyamide compositions having a longer pot life or precuring stability. It is also an object to provide novel cured polymers or resins. Other objects will become apparent from the discussion which follows.

The above and other objects are accomplished by a composition of matter comprising (1) a polyamide, obtained by reacting a dicarboxylic fatty acid and an aliphatic polyamine in the molar ratio of from about 1:2 to about 3:2 amine-to-acid, and (2) an aliphatic monoepoxide compound in amounts such that the ratio of epoxy oxygens-to-nitrogen atoms is from about 1:30 to about 1:1. Stating the ratios in terms of numerical values, the amine-to-acid ratio in the polyamide can vary from 0.5 to about 1.5, while the ratio of epoxy oxygens-to-nitrogen atoms can vary from about 0.033 to about 1.

The dicarboxylic fatty acids employed in the preparation of the polyamides contain from 4 to about 36 carbon atoms. The aliphatic polyamines have from 2 to about 5 nitrogen atoms and from 2 to about 12 carbon atoms. The aliphatic monoepoxide compounds which are used in the novel composition have from 3 to about 12 carbon atoms. A typical example of a composition of this invention is one comprising a polyamide obtained by reacting equimolar portions of succinic acid and tetraethylene pentamine, with propylene epoxide in amounts such that the ratio of epoxy oxygens to-nitrogen atoms is substantially 1-to-1.

The condensate of the composition described hereinabove is also an embodiment of this invention. It is obtained by reacting the polyamide with the monoepoxide compound. The reaction is usually carried out at a temperature of 25 to about 200° C. A compatible catalyst is also usually added. The catalyst may consist of a mixture of an inorganic acid and water such as a hydrohalic acid and water or sulfuric acid and water; or an organic acid and water such as acetic and water; or an acid anhydride and water such as acetic anhydride or malonic anhydride and water. In comparison to the viscosity of the untreated polyamide, the viscosity of the polyamide-monoepoxide condensate may be reduced by more than 33 percent as measured at a temperature of substantially 25° C., and by more than 75 percent as measured at a temperature of 66° C.

The acids from which the polyamides employed in the compositions of this invention are made have from 4 to about 36 carbon atoms. Nonlimiting examples of such acids are the aliphatic saturated and unsaturated dicarboxylic acids such as succinic acid, adipic acid, suberic acid, azelaic acid, glutaric acid, pimelic, sebacic acid, the dimer of linoleic acid having the general formula $C_{36}H_{64}O_4$, 2-pentene-1,5-dioic acid, allyl succinic acid, ethallyl succinic acid. The above constitute the preferred acids which are used either alone or as mixtures of two or more in the preparation of the polyamides used in the novel compositions of this invention. In general, the dibasic acids have the formula $R(COOH)_2$ in which R is a hydrocarbon group having from 2 to about 34 carbon atoms, and in which there is not more than 1 carboxyl, —COOH—, group attached to any one carbon atom. The hydrocarbon group represented by R may be saturated or unsaturated and either straight chain of branched chain. It may also be cyclic. An example of cyclic dicarboxy acids are 1,3-dicarboxy cyclohexane. Nonlimiting examples of dicarboxylic acids in which the R groups are aromatic are isophthalic acid and terephthalic acid.

The amines from which the polyamides are made are polyamines having from 2 to about 12 carbon atoms and from about 2 to about 5 nitrogen atoms, at least 2 of which are primary amino nitrogens. Nonlimiting examples of the polyamines are ethylene diamine, propylene diamine, tetramethylene diamine, pentamethyline diamine, dodecamethylene diamine, diethylene triamine, triethylene tetramine, tetraethylene triamine, etc.

The aliphatic monoepoxide compounds which are used in this invention have from 2 to about 12 carbon atoms and have the general formula

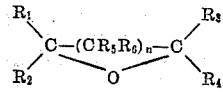

in which $R_1$, $R_2$, $R_3$, $R_4$, $R_5$ and $R_6$ can be the same or different and can be hydrogen atoms or hydrocarbon groups having from 1 to about 10 carbon atoms, and $n$ is an integer of the series 0, 1, 2, 3, etc. Preferred monoepoxy compounds used in this invention are those in which the number of carbon atoms in the sum $R_1+R_2+R_3+R_4+R_5+R_6$ is at least 1 and hence the preferred total number of carbon atoms in the epoxide is from 3 to about 12. These monoepoxides are all liquid at room temperature and are easy to handle. The hydrocarbon groups represented by $R_1$ through $R_6$ inclusive, can be alkyl, alkenyl, cycloalkyl, aryl, arylkyl and alkaryl monovalent radicals. The epoxy oxygen is attached to two different saturated aliphatic carbon atoms and the epoxy compound may therefore be called an aliphatic monoepoxide compound, which may have aromatic substituents thereon. Nonlimiting examples of the monoepoxides are ethyleneoxide, 1,2-propylene oxide, 1,3-propylene oxide, butylene oxide, isobutylene oxide, 1,2-epoxy-3-butene, 1,2-pentylene oxide, 2,3-hexylene oxide, 3-ethyl-2,3-pentylene oxide, octylene oxide, styrene oxide, decylene oxide and the like.

The epoxy-derived oxygen-to-nitrogen atom ratio in the polyamide-monoepoxide compositions can vary from 1:30 to 1:1, or when given in numerical values, from 0.003 to 1, as stated hereinabove. The preferred range of values for this ratio is from 2:1 to 1:1, epoxy-derived oxygen-to-nitrogen atoms. The numerical values of the preferred ratios is from 0.5 to 1. When the epoxy-derived oxygens and nitrogen atoms are present in these latter proportions, complex polyepoxide compositions prepared embodying such polyamides possess longer stability at ordinary storage temperatures.

The amines, acids and epoxy compounds used in the preparation of the composition of this invention are all commercially available. Their preparation is well known in the art and may be found in any organic text or reference book, an example of which is "Textbook of Organic Chemistry" by Fieser and Fieser, published by D. C. Heath and Company, New York, N.Y.

The organic polyamides used in this invention are prepared by reacting a dicarboxylic acid or a mixture of two or more such acids with a polyamine or a mixture of two or more polyamines of the type described hereinabove. The reaction is carried out in a suitable reaction vessel, preferably under an inert atmosphere such as nitrogen or carbon dioxide. Heat is applied until reaction commences, thereafter the temperature is increased to about 200° C. or more. The reaction is accompanied by foaming due to the liberation of water which is expelled at the elevated temperature. When it is desired to minimize the amount of foaming that takes place, the reaction may be carried out by slowly adding the polyamines to the dicarboxylic acid during the heating period. In this way very little or no foaming is observed during the reaction.

The polyamide-monoepoxide composition of this invention consists of an admixture of an organic polyamide and an aliphatic monoepoxide compound in amounts such that there are from 1 to about 30 nitrogen atoms per epoxide group as stated hereinabove. This forms a novel composition which upon further treatment at elevated temperatures produces a modified polyamide composition of greatly reduced viscosity. A modified polyamide is, in effect, a condensate of the polyamide and the aliphatic monoepoxide compounds. The condensation is brought about by heating the composition to and maintaining it at reflux temperature for a period of from about 2 to about 24 hours until the pH of the condensate is from 7.2 to about 10. To assist the reaction, the heating is performed in the presence of a catalyst such as a mixture of hydrochloric acid and water. The amount of hydrohalic acid used is from about 0.5 to about 3 weight percent based on the weight of the polyamide-epoxide composition. The amount of water employed is from about 1 to about 10 weight percent based on the weight of the composition. The various compositions on this invention are more fully illustrated in the following examples.

*Example I*

To a reaction vessel equipped with heating and cooling means, a means for refluxing vaporized liquids, and means for agitation, were added 10 parts of propylene oxide and 40 parts of a diethylenetriamine polyamide of the dimer of linoleic acid, obtained by reacting equimolar quantities of diethylenetriamine and linoleic acid dimer until a viscosity of 100,000 cps. at 25° C. and 8,200 cps. at 66° C., an amine value of 210–230, a specific gravity of 0.99, and a Gardner color of 12 is obtained. The propylene oxide and polyamide were agitated until a homogeneous composition was obtained. To this composition was added a catalyst composed of a mixture of 2.5 parts of water and 1 part of concentrated, 12 N, hydrochloric acid. The contents of the reaction vessel were then heated to and maintained at reflux temperature for a period of substantially 14 hours until the pH of the solution was reduced from 11 to 8.2. The pH measurement was made on a 10 percent solution of the composition in a mixture of 8 parts of ethyl-alcohol and 1 part of water as solvent. The water and hydrochloric acid catalyst was removed by distillation under reduced pressure. The monoepoxide-polyamide condensate or reaction product had a viscosity of 62,500 centipoises at 25° C. and 1,927 centipoises at a temperature at 66° C. as compared to a viscosity of untreated polyamide of 100,000 cps. at 25° C. and 8,240 cps. at 66° C. Analysis showed that there was no hydrochloric acid left in the product after the vacuum distillation. The ratio of epoxide-derived oxygens-to-polyamide nitrogens both in the epoxide-polyamide composition prior to reaction as well as in the condensate after reaction was substantially 0.8.

*Example II*

The procedure of Example I was repeated using 40 parts of propylene oxide, 40 parts of diethylene triamine polyamide of the dimer of linoleic acid having a viscosity greater than 100,000 cps. at 25° C. and 17,900 cps. at 66° C., together with a mixture of 2.5 parts of water and 1 part of concentrated hydrochloric acid. After refluxing until the pH had been reduced from 11 to 8.5, the excess propylene oxide, together with the water and hydrochloric acid catalyst were removed by distillation at reduced pressure. Substantially 10.7 parts of propylene oxide had condensed or reacted with the polyamide to give a product which had a viscosity of 5,400 centipoises at a temperature of 66° C. which is a reduction of over 70 percent based on the viscosity of 17,900 centipoises at 66° C. of the uncondensed polyamide. The ratio of monoepoxide-derived oxygens-to-polyamide nitrogens was about 3.3 in the composition before reaction and substantially 0.9 in the condensate after removal of the excess epoxide.

In like manner, the procedure of Example II was repeated refluxing the composition until a pH of 8.6 had been reached. The condensate after removal of excess propylene oxide, had a viscosity of 11,700 centipoises at 66° C. as compared to a viscosity of 17,900 centipoises at the same temperature for the unreacted polyamide.

*Example III*

Following the procedure of Example I a composition is prepared containing 1 part of dodecylene oxide and 1 part of a polyamide obtained by reacting succinic acid and tetraethylene pentamine in equimolar quantities until an average molecular weight of substantially 2,700 had been obtained. To this composition is then added .04 part of a catalyst mixture consisting of 25 parts of water and 10 parts of concentrated sulfuric acid. The catalyzed composition is refluxed until a pH of 7.2 is obtained. The excess dodecylene oxide and catalyst are then removed by distillation at reduced pressure.

The procedure of Example II is repeated with the modification that the refluxing is stopped when the pH has reached 10.

*Example IV*

To 10.8 parts of a polyamide obtained by reacting azelaic acid with ethylene diamine at elevated temperature until the average molecular weight of the polyamide is 1,078, is added 1.6 parts of 1,2-pentylene oxide. The mixture is agitated to produce a polyamide-epoxide composition containing 1 molecule of epoxide compound per nitrogen atom. The composition is then refluxed for a period of 24 hours providing a polyamide-epoxide condensate which has an epoxide-derived oxygen-to-nitrogen atom ratio of substantially 1-to-1.

The procedure of Example IV is followed employing a polyamide obtained by reacting 56 parts of dilinoleic acid dimer with 19 parts of tetraethylene pentamine, and 29 parts of propylene oxide. This produces a polyamide-epoxide composition in which the ratio of epoxide equivalents-to-nitrogen atoms is 1-to-1. Upon refluxing for a period of substantially 20 hours, a polyamide-epoxide condensate of the above-named components is obtained in which the ratio of condensed epoxide-derived oxygen-to-nitrogen atoms is 1-to-1.

*Example V*

Following the procedure of Example I, a polyamide-epoxide composition is prepared from 0.7 part of 1,2-butylene oxide and 55 parts of a 1,12-diamino dodecane polyamide of sebacic acid. The latter is obtained by reacting sebacic acid with 1,12-diamino dodecane at elevated temperatures, until a viscosity of 10,000 cps. at 66° C. is reached. This polyamide-epoxide composition has an epoxide-to-nitrogen ratio of 1-to-30. Upon refluxing for about 6 hours, a condensate is formed in which the ratio of epoxide-derived oxygen-to-nitrogen atoms is substantially 1-to-30.

In a similar manner, when the butylene oxide in the procedure of Example V is replaced with 20 parts of styrene oxide,

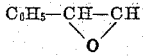

a polyamide-epoxide composition is obtained in which the ratio of epoxy oxygen-to-nitrogen atoms is 1-to-2. Refluxing this composition until all the epoxide groups have reacted with the polyamide provides a condensate in which the ratio of epoxide-derived oxygen-to-nitrogen atoms is 1:2 or a numerical value of 0.5.

In a similar manner, a composition is prepared containing 0.4 part of 1,3-propylene oxide and 46 parts of a diethylene triamine polyamide of dilinoleic acid dimer, the ratio of epoxide-to-nitrogen atoms in this composition is 1-to-30. The polyamide is obtained by reacting 56 parts of dilinoleic acid dimer with 5 parts of diethylene triamine, a molar ratio of 1-to-2, amine-to-acid. Upon refluxing for a period of substantially 12 hours, a condensate of the above-named polyamide and propylene oxide is obtained in which the ratio of epoxide-derived oxygen-to-nitrogen atoms is 1-to-30.

Equally good results are obtained when the ratio of amine-to-acid in the polyamide is 3-to-2.

When gaseous ethylene oxide is used in place of the propylene oxide, it is bubbled through the polyamide at a temperature sufficient to bring about reaction. When 3 parts of ethylene oxide have condensed with the polyamide, the ratio of epoxide-derived oxygen-to-nitrogen atoms is 1-to-3.

One use for the modified polyamide resins described above is in the preparation of polymerizable compositions with glycidyl polyether compounds. Such compositions have a lower viscosity and greater stability than compositions prepared in which the polyamides have not been condensed or reacted with monoepoxide compounds. As stated above, the lower viscosity is important in instances where it is desired to have the polymerizable composition displace air from small and difficulty accessible spaces such as, for example, the spaces in between turns of wire on a magnet core. The increased stability or longer pot life is important in order that the composition remain fluid for a sufficient length of time to permit it to penetrate the above-mentioned difficulty accessible spaces before starting to set up. The longer period of stability is also advantageous in the process of electrical insulation wherein the insulating composition is applied by a dipping technique since it permits successive dippings over prolonged periods of time in the same composition. In the latter case, waste can be cut down to a minimum.

The glycidyl polyether compounds, which are employed in preparing the polyamide-monoepoxide condensate and glycidyl polyether compositions, are prepared by reacting a polyhydric alcohol with an epihalohydrin which is a halogen epoxy hydrocarbon compound, in the presence of either a base or an acid. For example, the reaction of a mol of a dihydric phenol such as 2,2-bis(4-hydroxyphenyl)propane with one or more mols of epichlorohydrin in the presence of a base such as sodium hydroxide produces a glycidyl polyether having terminal epoxy groups. Similarly, 1,2,3-trihydroxypropane can be reacted with 1 or more mols of 1,2-epoxy-3-chlorohexane in the presence of an acid catalyst such as borontrifluoride or its derivatives to produce a polyether compound having epoxy groups at each end of the molecules. These glycidyl ether compositions and method for their preparation are described in various technical publications. Various patents also refer to these compounds and to their preparation. Among the patents, for example, are the Castan Patents 2,324,483 and 2,444,333. The product that is obtained when epichlorohydrin is one of the reactants may be represented by the formula

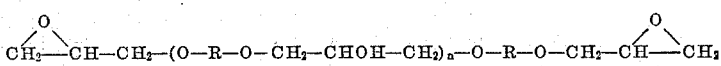

wherein R represents a divalent hydrocarbon radical of a polyhydric alcohol such as that of a dihydric phenol or glycol, and $n$ is an integer of the series 0, 1, 2, 3, etc. In general, these glycidyl ethers have an epoxy equivalency greater than 1.0 and contain terminal 1,2-epoxy groups. By the epoxy equivalency is meant the number of 1,2-epoxy groups contained in the average molecule of the glycidyl ether. Since the measured molecular weight of the mixture, upon which the epoxy equivalency is dependent, is the average molecular weight, the epoxy equivalency will not necessarily be 2.0 but will be between 1.0 and 2.0.

When the polyhydric alcohols employed in the preparation of the glycidyl polyethers are dihydric phenols they can be one or more phenols having from 1 to about 2 aromatic nuclei in the molecule such as resorcinol, catechol, hydroquinone, ethyl resorcinol, 2,2-bis(4-hydroxyphenol)propane, bis(4-hydroxyphenyl)methane, 2,2-bis(4-hydroxyphenyl)butane, 1,5-dihydroxynaphthalene, etc. When the polyhydric alcohols employed are nonaromatic, they can be alcohols having from 2 to about 20 carbon atoms and from 2 to 3 hydroxy groups. Non limiting examples of such alcohols are 1,2-dihydroxyethane, 1,2,3-trihydroxypropane, 1,3-dihydroxyoctane, 1,3,5-trihydroxydodecane, 1,2-dihydroxyeicosane. Another class of hydroxy compounds that can be used consists of polyether glycols such as diethylene glycol, triethylene glycol, hexaethylene glycol, etc. When preparing the glycidyl polyether compounds, one or a mixture of two or more alcohols can be employed. It will be noted that the number of carbon atoms in the polyhydroxy compounds used varies from 2 to about 20. The preferred polyhydroxides used, however, are those having from 2 to about 12 carbon atoms and 2 hydroxy groups, as compositions prepared from such alcohols have better cohesive qualities.

Examples of epihalohydrins employed in the preparation of the polyether compounds are 1,2-epoxy-3-chloropropane, 1,2-epoxy-4-chlorobutane, 1,2-epoxy-8-bromooctane, 2,3-epoxy-5-chlorododecane, 5-6-epoxy-7-bromoeicosane. Of these the 1,2-epoxy-3-halopropanes such as 1,2-epoxy-3-chloropropane gives very good results and their use constitutes a preferred embodiment in the instant invention. A method for the preparation of epihalohydrins is given in Organic Syntheses by Gilman, volume I, 2nd edition, John Wiley and Sons, Inc., New York.

An embodiment of this invention, therefore, is a composition comprising (1) a polyamide-monoepoxide condensate having an epoxy-derived oxygen-to-nitrogen atom ratio of from about 1:30 to 1:1 and (2) a glycidyl polyether of a dihydric alcohol having a 1,2-epoxy-equivalency greater than 1.0. Another embodiment of this invention is the copolymer of the components (1) and (2). This copolymer is obtained by contacting the polyamide-monoepoxide condensate with a glycidyl polyether of a dihydric alcohol, both of the type described above, at elevated temperatures. For example, the copolymerization readily occurs at temperatures of from about 65° C. to about 120° C. In practical application, however, it is found that temperatures of about 70° C. to about 90° C. are sufficient to copolymerize the two components into a resilient resinous composition. This is brought out more fully in the examples given below. The polyamide-monoepoxide condensate can be interpolymerized with the glycidyl polyether of a dihydric alcohol in any desired proportions of from about 10 weight percent of the polyamide-monoepoxide condensate to about 90 weight percent of such component. To obtain more serviceable elastomeric or resilient interpolymers, it is preferred to copolymerize the (1) polyamide-monoepoxide condensate and the (2) glycidyl polyether in proportions such that the ratio of (1)-to-(2) is from about 1:5 to about 3:1 in parts by weight.

Examples of polymerizable compositions prepared using polyamide-epoxide condensates together with glycidyl polyether compounds are illustrated in the following examples.

Example VI

To a vessel were added 3 parts of the composition of Example I having a pH of 8.2 and 1 part of a glycidyl ether resin obtained by reacting 2,2-bis(4-hydroxyphenyl)propane with epichlorohydrin in the molar ration of 1-to-2 respectively and having 140–210 grams of resin per gram equivalent of epoxide. The contents were agitated until a homogeneous composition was obtained. The polyamide-epoxide and glycidyl polyether composition, after storage at 25° C. for a period of 72 hours, gave no signs of gel formation. At 66° C., the composition began to gel after 10 hours storage. At 93° C., which is a suitable curing temperature, the composition set in a period of 4 hours.

Substitution of untreated polyamide in the procedure of Example VI gave a gel in 9½ hours at 25° C. and in 35 minutes at 66° C.

In a manner similar to Example VI, a composition is prepared containing 1 part of the composition of Example I and 1 part of the glycidyl polyether described in Example VI. Likewise, a composition is prepared containing 1 part of the composition of Example I and 3 parts of the glycidyl polyether used in Example VI. When these compositions are heated to and maintained at temperatures ranging from about 60 to about 120° C. reaction occurs with the formation of a resilient polymeric substance.

Example VII

Following the procedure of Example VI, a polymerizable composition is prepared containing 1 part of the composition of Example II having a pH of 7.2, and 10 parts of the diglycidyl ether of 1,2,3-trihydroxypropane obtained by reacting epichlorohydrin with 1,2,3-trihydroxypropane in a molar ratio of 2-to-1 respectively. To form the copolymer of this composition, it is heated to 100° C. and maintained at that temperature until it has set-up.

In like manner, a composition is prepared from 1 part of the polyamide-expoxide composition of Example II having a pH of 10 and 5 parts of the diglycidyl ether of trihydroxypropane.

Example VIII

A polymerizable composition is prepared from 10 parts of the polyamide-epoxide condensate of Example III and 1 part of the diglycidyl ether of triethylene glycol. The latter is obtained by reacting epichlorohydrin with triethylene glycol in the molar ratio of 2-to-1 respectively.

Example IX

A polymerizable composition is prepared by the process of Example VI containing 2 parts of the polyamide-monoepoxide condensate of Example IV, together with 1 part of the diglycidyl ether of 2,2-bis(4-hydroxyphenyl)propane.

The polyamide-monoepoxide and polyether compositions are useful, among other things, for insulating electrical copper conductors. The compositions are applied to the copper surface by any suitable means such as spraying, brushing, or immersing the copper electrical unit in the fluid composition. Excess insulating fluid may be allowed to drain off, and the unit, with a coating of the composition of this invention on the surfaces which are to be insulated, is then subjected to curing conditions at elevated temperatures of from about 93° C. to about 150° C., for a period of from 1 to 20 hours. This results in a hard plastic insulating film being formed on the coated surfaces. Alternatively, the electrical unit may be immersed in a container filled with the composition of this invention and the container, together with the fluid and electrical unit, subjected to curing temperatures so as to form an electrical unit which is completely encapsulated in a plastic material of this invention. The following examples illustrate the methods used when employing the compositions for this purpose.

Example X

An electrical coil containing a plurality of turns of copper wire was completely immersed in the fluid composition of Example VI. The vessel and immersed coil were then placed in a vacuum apparatus and the air removed, creating a partial vacuum in the system. This expelled any air trapped in the coil. Air at atmospheric pressure was then admitted to the apparatus, thus enabling the low viscosity resin to penetrate all spaces in between the turns of wire so as to completely cover all interior surfaces. The electrical coil was removed from the resin solution, placed in an oven and subjected to a temperature of substantially 120° C. for a period of about 12 hours. A thin, hard film was formed on the surface of the copper wire as the resin set at the elevated temperatures. Units insulated with this composition withstand high potentials across the wire and the core of the unit without breakdown.

Example XI

The procedure of Example X was repeated except that the wound unit and the resin composition were first placed in the high vacuum apparatus and the air removed prior to immersion of the electrical unit in the resin. When this procedure is followed, there is less danger of trapping air in small pockets in the electrical unit and complete impregnation of the entire coil with the resin is facilitated.

Example XII

An electrical coil consisting of a plurality of turns of copper wire was immersed in a resin under vacuum as described in Example XI. The resin was held in a container which was to serve as a casing for the finished unit. The casing, resin, and coil were then placed in an oven and subjected to a temperature of approximately 120° C. for a period of about 12 hours. The resin set into a resilient material, forming an encapsulated electrical unit.

While in the above examples the use of the compositions of this invention have been illustrated as insulating materials for electrical units, there are many other uses to which they are applicable. The compositions can be employed as protective paints for metal surfaces, laminating plastics, and the like. In general, the compositions may be employed in any process wherein the resin is to be cured at elevated temperatures but where it is desirable to have a composition of low viscosity which remains stable at room temperature for reasonable periods of time.

The compositions of this invention may also contain from 1 to 500 weight percent of one or more inorganic fillers such as alumina, silica, asbestos, titanium dioxide, zinc oxide, magnesium silicate, mica, calcium carbonate, glass beads, etc. The amount of filler is based on the amount of polymerizable composition used. The composition is also useful as a binder for the oxidizer in the manufacture of rocket propellants. For example, a homogeneous mixture of 75 weight percent ammonium perchlorate and 25 weight percent of the composition of Example VI, cast into a rocket engine and cured at a temperature within the range of 60 to 80° C. sets into a resilient composition. This composition performs well on ignition, burning only on the surface and does not crack from the heat generating on burning.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A composition comprising (1) a polyamide-monoepoxide condensate obtained by heating, at a temperature sufficiently high to bring about condensation, a diethylene triamine amide of dilinoleic acid with propylene epoxide in amounts such as to provide an epoxide-to-nitrogen atom ratio of substantially from 0.5 to 1 and (2) a glycidyl polyether of 2,2-bis(4-hydroxyphenyl)propane having a 1,2-epoxy equivalency between 1.0 and 2.0, the amounts being such that the ratio of (1)-to-(2) is from 1:3 to 3:1 in parts by weight.

2. A composition comprising (1) a polyamide-monoepoxide condensate having an epoxy-derived oxygen-to-nitrogen atom ratio of from about 1:3 to about 1:1, obtained by the condensation of a polyamide and a monoepoxide compound, wherein said polyamide is obtained by heating at a temperature sufficiently high to bring about amide formation a dicarboxylic aliphatic acid containing from 4 to about 36 carbon atoms with an aliphatic polyamine having from 2 to about 5 nitrogen atoms wherein at least 2 of said nitrogen atoms are primary amino nitrogens, and from 2 to about 12 carbon atoms, wherein said polyamine and said acid are present in the molar ratio of from about 1:2 to about 3:2 polyamine-to-acid, and said monoepoxide compound has from about 2 to about 12 carbon atoms, and has the general formula

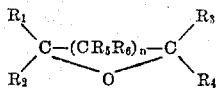

in which each of $R_1$, $R_2$, $R_3$, $R_4$, $R_5$ and $R_6$ is selected from the class consisting of hydrogen atoms and hydrocarbon groups having from 1 to about 10 carbon atoms, and $n$ is an integer taken from the series 0, 1, 2, 3, . . . and (2) a glycidyl polyether having a 1,2-epoxy equivalency between 1.0 and 2.0, and wherein the ratio of (1)-to-(2) is from about 1:3 to about 3:1 in parts by weight.

3. A copolymer of (1) a polyamide-monoepoxide condensate obtained by the condensation of a polyamide and a monoepoxide, said condensate having an epoxy-derived oxygen-to-nitrogen atom ratio of from about 1:3 to about 1:1 wherein said polyamide is obtained by heating at a temperature sufficiently high to bring about amide formation a dicarboxylic aliphatic acid containing from 4 to about 36 carbon atoms with an aliphatic polyamine having from 2 to about 5 nitrogen atoms wherein at least two of said nitrogen atoms are primary amino nitrogens, and from 2 to about 12 carbon atoms, in the molar ratio of from about 1:2 to about 3:2 amine-to-acid, and said monoepoxide compound has from 2 to about 12 carbon atoms and has the general formula

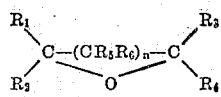

in which each of $R_1$, $R_2$, $R_3$, $R_4$, $R_5$ and $R_6$ is selected from the class consisting of hydrogen atoms and hydrocarbon groups having from 1 to about 10 carbon atoms, and $n$ is an integer taken from the series 0, 1, 2, 3, . . . and (2) a glycidyl polyether having a 1,2-epoxy equivalency between 1.0 and 2.0, the amounts being such that the ratio of (1)-to-(2) is from about 1:3 to about 3:1 in parts by weight.

4. The process of contacting at temperatures sufficiently high to bring about copolymerization (1) a polyamide-monoepoxide condensate obtained by the condensation of a polyamide and a monoepoxide and having an epoxy-derived oxygen-to-nitrogen atom ratio of from about 1:3 to about 1:1, wherein said polyamide is obtained by heating at a temperature sufficiently high to bring about amide formation a dicarboxylic aliphatic acid containing from 4 to about 36 carbon atoms with an aliphatic polyamine having from 2 to about 5 nitrogen atoms wherein at least two of said nitrogen atoms are primary amino nitrogens and from 2 to about 12 carbon atoms, wherein said polyamine and said acid are present in the molar ratio of from about 1:2 to about 3:2 polyamine-to-acid, and said monoepoxide compound has from 2 to about 12 carbon atoms, and has the general formula

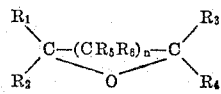

wherein each of $R_1$, $R_2$, $R_3$, $R_4$, $R_5$ and $R_6$ are selected from the class consisting of hydrogen atoms and hydrocarbon groups having from 1 to about 10 carbon atoms, and $n$ is an integer taken from the series 0, 1, 2, 3, . . . and (2) a glycidyl polyether having a 1,2-epoxy equivalency between 1.0 and 2.0, and wherein the ratio of (1)-to-(2) is from about 1:3 to about 3:1 in parts by weight, to form a polyamide-monoepoxide and glycidyl polyether copolymer.

5. The process of contacting at temperatures sufficiently high to bring about copolymerization (1) a polyamide-monoepoxide condensate obtained by heating at a temperature sufficiently high to bring about condensation, a diethylene triamine amide of dilinoleic acid with propylene epoxide in amounts such as to provide an epoxide-to-nitrogen atom ratio of from about 0.5 to about 1 and (2) a glycidyl polyether of 2,2-bis(4-hydroxyphenyl)propane having a 1,2-epoxy equivalency between 1.0 and 2.0, in amounts such that the ratio of (1)-to-(2) is from about 1:3 to about 3:1 in parts by weight, to form a polyamide-monoepoxide and glycidyl polyether copolymer.

6. A composition comprising (1) a polyamide-monoepoxide condensate having an epoxy-derived oxygen-to-nitrogen atom ratio of from about 1:3 to about 1:1, obtained by the condensation of a polyamide and a monoepoxide compound, wherein said polyamide is obtained by heating at a temperature sufficiently high to bring about amide formation, a dicarboxylic aliphatic acid containing from 4 to about 36 carbon atoms and an aliphatic polyamide having from 2 to about 5 nitrogen atoms wherein at least 2 of said nitrogen atoms are primary amino nitrogens and from 2 to about 12 carbon atoms, wherein said polyamine and said acid are present in the molar ratio of from about 1:2 to about 3:2 polyamine-to-acid, and said monoepoxide compound has from about 2 to about 12 carbon atoms, and has the general formula

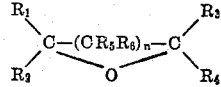

in which each of $R_1$, $R_2$, $R_3$, $R_4$, $R_5$, and $R_6$ is selected from the class consisting of hydrogen atoms and hydrocarbon groups having from 1 to about 10 carbon atoms, and $n$ has a maximum value of 1, and (2) a glycidyl polyether of a polyhydric material of the group consisting of phenols and polyhydric alcohols having a 1,2-epoxy equivalency between 1.0 and 2.0, and wherein the ratio of (1)-to-(2) is from about 1:3 to about 3:1 in parts by weight.

7. A copolymer having the composition of claim 6.

8. A composition comprising (1) a polyamide-monoepoxide condensate having an epoxy-derived oxygen-to-nitrogen atom ratio of from about 1:3 to about 1:1, obtained by the condensation of a polyamide and a monoepoxide compound, wherein said polyamide is obtained by heating at a temperature sufficiently high to bring about amide formation, a dicarboxylic aliphatic acid containing from 4 to about 36 carbon atoms with an aliphatic polyamine having from 2 to about 5 nitrogen atoms wherein at least 2 of said nitrogen atoms are primary amino nitrogens and from 2 to about 12 carbon atoms, wherein said polyamine and said acid are present in the molar ratio of from about 1:2 to about 3:2 polyamine-to-acid, and said monoepoxide compound has from about 2 to about 12 carbon atoms, and has the general formula

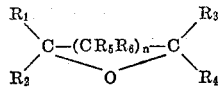

in which each of $R_1$, $R_2$, $R_3$, $R_4$, $R_5$, and $R_6$ is selected from the class consisting of hydrogen atoms and hydrocarbon groups having from 1 to about 10 carbon atoms, and $n$ has a maximum value of 1, and (2) a glycidyl polyether of a polyhydric material of the group consisting of phenols having from 1 to 2 six-membered carbon rings in the molecule and having from 6 to about 16 carbon atoms; and polyhydric alcohols having from 2 to about 20 carbon atoms, from 2 to 3 hydroxy groups, and from zero to about 6 ether-linked oxygens; said glycidyl polyether having a 1,2-epoxy equivalency between 1.0 and 2.0, and wherein the ratio of (1)-to-(2) is from about 1:3 to about 3:1 in parts by weight.

9. A copolymer having the composition of claim 8.

10. A composition comprising (1) a polyamide-monoepoxide condensate having an epoxy-derived oxygen-to-nitrogen atom ratio of from about 1:3 to about 1:1, obtained by the condensation of a polyamide and a monoepoxide compound, wherein said polyamide is obtained by heating at a temperature sufficiently high to bring about amide formation, a dicarboxylic aliphatic acid containing from 4 to about 36 carbon atoms with an aliphatic polyamine having from 2 to about 5 nitrogen atoms wherein at least 2 of said nitrogen atoms are primary amino nitrogens and from 2 to about 12 carbon atoms, wherein said polyamine and said acid are present in the molar ratio of from about 1:2 to about 3:2 polyamine-to-acid, and said monoepoxide compound has from about 2 to about 12 carbon atoms, and has the general formula

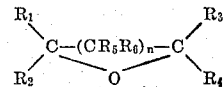

in which each of $R_1$, $R_2$, $R_3$, $R_4$, $R_5$, and $R_6$ is selected from the class consisting of hydrogen atoms and hydrocarbon groups having from 1 to about 10 carbon atoms, and $n$ has a maximum value of 1, and (2) a glycidyl polyether of a polyhydric material of the group consisting of phenols having from 1 to 2 six-membered carbon rings in the molecule and having from 6 to about 16 carbon atoms, said polyether having a 1,2-epoxy equivalency between 1.0 and 2.0, and wherein the ratio of (1)-to-(2) is from about 1:3 to about 3:1 in parts by weight.

11. A copolymer having the composition of claim 1.

References Cited in the file of this patent

UNITED STATES PATENTS

| | | |
|---|---|---|
| 2,652,388 | De Groote | Sept. 15, 1953 |
| 2,705,223 | Renfrew et al. | Mar. 29, 1955 |
| 2,707,708 | Wittcoff | May 3, 1955 |
| 2,723,241 | De Groote et al. | Nov. 8, 1955 |
| 2,760,944 | Greenlee | Aug. 28, 1956 |
| 2,864,775 | Newey | Dec. 16, 1958 |

FOREIGN PATENTS

| | | |
|---|---|---|
| 529,729 | Canada | Aug. 28, 1956 |

OTHER REFERENCES

Ser. No. 393,282, Hopff et al. (A.P.C.), published Apr. 20, 1943.

The Van Nostrand Chemist's Dictionary, D. Van Nostrand Co. Inc., New York, 1953, page 281, column 2.